(12) United States Patent
Orlandi et al.

(10) Patent No.: US 7,726,374 B2
(45) Date of Patent: Jun. 1, 2010

(54) APPARATUS AND METHOD FOR OBTAINING LABELS

(75) Inventors: Ireneo Orlandi, Curtatone (IT); Maurizio Pedercini, Marmirolo (IT); Matteo Grioni, Castellucchio (IT)

(73) Assignee: Sacmi Verona S.P.A., Imola (Bo) (IT)

( * ) Notice: Subject to any disclaimer, the term of this patent is extended or adjusted under 35 U.S.C. 154(b) by 0 days.

(21) Appl. No.: 11/519,223

(22) Filed: Sep. 12, 2006

(65) Prior Publication Data

US 2007/0056679 A1    Mar. 15, 2007

(30) Foreign Application Priority Data

Sep. 12, 2005   (IT) .................. MO2005A0230

(51) Int. Cl.
| | |
|---|---|
| B29C 65/00 | (2006.01) |
| B29C 53/00 | (2006.01) |
| B32B 37/00 | (2006.01) |
| B32B 38/04 | (2006.01) |
| B29D 22/00 | (2006.01) |
| B65C 3/16 | (2006.01) |
| C08J 5/00 | (2006.01) |
| B65C 9/00 | (2006.01) |

(52) U.S. Cl. .................. 156/568; 156/86; 156/213; 156/215; 156/218; 156/272.8; 156/308.2; 156/379.8

(58) Field of Classification Search .................. 156/86, 156/250, 256, 258, 272.8, 308.2, 308.4, 379.6, 156/379.8, 379.9, 380.7, 510, 516, 517, 521, 156/566, 567, 568, 539, 556, 85, 212, 213, 156/215, 217, 218, 275.1, 275.3, 308.6, 309.9, 156/538, 84, 309.6, 380.1

See application file for complete search history.

(56) References Cited

U.S. PATENT DOCUMENTS

| 4,013,496 A | * | 3/1977 | Amberg .................. 156/85 |
| 4,238,267 A | * | 12/1980 | Konstantin ............... 156/379.6 |
| 4,250,798 A | * | 2/1981 | Yamato et al. ............. 493/306 |
| 5,741,381 A | * | 4/1998 | Dolence et al. ............ 156/64 |
| 2002/0017468 A1 | * | 2/2002 | Clay .......................... 206/217 |

* cited by examiner

*Primary Examiner*—Richard Crispino
*Assistant Examiner*—Brian R Slawski
(74) *Attorney, Agent, or Firm*—Nixon & Vanderhye P.C.

(57) ABSTRACT

An apparatus for obtaining "shrink sleeve" labels, comprises a carousel that is provided peripherally with a plurality of spindles configured for being wound from portions of plastic film, a sealing device cooperating with said spindles means for sealing opposite edges of said portions for obtaining said "shrink sleeve" labels, said sealing device comprising a laser device; a method for labelling containers, comprises in sequence:

advancing a plastic film in an advancing direction;

cutting said plastic film transversely to said advancing direction to obtain a portion of plastic film;

winding said portion in such a way as to make opposite edges of said portion overlap one another;

joining together said edges to obtain a "shrink sleeve" label, said joining comprising sealing by means of a laser beam.

28 Claims, 12 Drawing Sheets

APPARATUS AND METHOD FOR OBTAINING LABELS

The invention relates to an apparatus and a method for obtaining labels for containers, in particular "shrink sleeve" labels in PET, PVC, polypropylene (PP), polystyrene (PS), or other materials suitable for being heat-shrunk. By the term "shrink sleeve", tubular labels in plastic film are intended that are placed on a container and are subsequently heated to shrink on the external surface of the container and assume the shape thereof.

WO2004/020291 discloses an apparatus for labelling containers comprising a movement device that moves along an advancing direction a heat-shrinkable plastic film from which the "shrink sleeve" labels are obtained. The plastic film is unwound from a reel and is advanced to a transferring drum. A cutting device is provided that cuts the plastic film transversely to the advancing direction, in such a way as to obtain portions of plastic film having a preset length, measured longitudinally to the plastic film, so as to obtain "shrink sleeve" labels having a preset diameter.

There is provided a pneumatic device that can suck air inside the transferring drum through respective holes obtained on an external cylindrical wall of the latter.

The transferring drum is adjacent to a rotatable carousel that peripherally and rotatably supports a plurality of spindles spaced apart from one another. Each spindle is shaped to support a bottle to be labelled and to receive from the transferring drum a portion of plastic film from which a "shrink sleeve" label is obtained. Each spindle comprises a further external cylindrical wall having a diameter substantially the same as the preset diameter of the "shrink sleeve" labels, provided with further holes through which air is sucked from outside to inside the spindle, to make a portion of plastic film adhere to the further cylindrical wall. By means of the further holes air can also be expelled outside the spindle to expand a "shrink sleeve" label radially that is obtained after subjecting a portion of plastic film to a heat-sealing process. With each spindle there is associated a heat-sealing device comprising a bar element that can be heated by means of an electric resistance. The bar element is brought up to the portion of plastic film when the latter is wound around the spindle and seals together opposite edges of the portion of plastic film parallel to the second axis, so as to obtain a "shrink sleeve" label.

Each spindle comprises a supporting plate fixed transversely to the further cylindrical wall, shaped to supportingly receive a bottle. The spindle is axially drivable in such a way as to be able to insert the bottle inside the "shrink sleeve" label. This can occur only after the label has been dilated, through the air expelled from the further holes, in such a way as to give it a greater diameter than a transverse maximum dimension of the bottle.

During operation, the plastic film is advanced by the movement device to the transferring drum, near which it is cut by the cutting device in such a way as to obtain a portion of plastic film of preset length.

The portion of plastic film is advanced in such a way as to adhere to the transferring drum by means of the air sucked through the holes. Subsequently, the portion of plastic film is transferred to a spindle, which in the meantime has been taken by the carousel to near the transferring drum. The portion of plastic film is made to adhere to the spindle by sucking air through the further holes. The portion of plastic film is wound on the further cylindrical wall in such a way as to have the opposite edges of the portion of plastic film partially overlapping one another longitudinally to the spindle. At this point the bar element is driven in such a way as to touch the edges of the portion of material, mutually sealing them and thus obtaining the "shrink sleeve" label.

At this point the "shrink sleeve" label is dilated by means of pressurised air expelled from the further holes so that it can reach a diameter greater than that of the spindle and can be removed from the latter. Whilst the "shrink sleeve" label is stationary with respect to the carousel, the supporting plate is driven so that the bottle supported thereupon can be lowered and introduced inside the "shrink sleeve" label. The bottle and the "shrink sleeve" label associated therewith are then conveyed to a heating station that forces the "shrink sleeve" label to contract through the heat effect, thus adhering to the side surface of the bottle.

The heat seals obtained with a hot bar are unsightly because at the heat seals the material of the label tends to get deformed in a clear manner, giving rise to creases and surface irregularities, which are not considered to be acceptable by the market.

Further, these heat seals require the blades between which opposite edges of the label are imprisoned to remain in contact with one another and with the material to be sealed for a relatively long period of time compared with the machine time available in an operating cycle, with the result that it is impossible to obtain high productivity.

The seals obtained by means of glues are first of all difficult to obtain without soiling with glue the parts of spindles on which the labels are wound.

Further, if thermofusible glues are used, the joint zones between the edges of each label tend to yield when the labels are heated to activate the heat-shrinkage thereof.

In order to overcome this drawback, special glues can be used that react to UV rays and do not decompose with heat; but this involves greater costs for acquiring glues and imposes the necessity of providing UV rays to dry the glues. Further, the zones sealed with the traditional systems have a certain width, that is approximately of the order of a few millimeters, which does not enable the space available for printing on the plastic film to be used in an optimal manner.

A defect of the known apparatuses for labelling is that they do not seal the "shrink sleeve" labels in a satisfactory manner.

A further defect of the known apparatuses is that it is difficult to remove axially a label from the spindle on which it has been obtained inasmuch as the label has a tubular shape having the same diameter as the spindle.

An object of the invention is to improve the systems for manufacturing "shrink sleeve" labels.

Another object of the invention is to obtain an apparatus that enables containers to be labelled with great precision and reliability.

A further object of the invention is to obtain an apparatus that is able to seal labels in a satisfactory manner.

A still further object of the invention is to obtain an apparatus that is able to process labels correctly without subjecting them to sudden stress that could damage them.

In a first aspect of the invention, an apparatus is provided for obtaining "shrink sleeve" labels, comprising a carousel that is provided peripherally with a plurality of spindles configured for being wound from portions of plastic film, sealing devices cooperating with said spindles for sealing opposite edges of said portions to obtain said "shrink sleeve" labels, wherein said sealing devices comprises a laser device.

In a second aspect of the invention, a method is provided for labelling containers, comprising in sequence:
advancing a plastic film along an advancing direction;
cutting said plastic film transversely to said advancing direction to obtain a portion of plastic film;

winding said portion in such a way as to make opposite edges of said portion overlap one another;

joining together said edges to obtain a "shrink sleeve" label, wherein said joining comprises sealing by means of a laser beam.

Owing to the first and second aspect of the invention it is possible to seal with great precision and evenness opposite edges of a "shrink sleeve" label. Further, it is possible to obtain "shrink sleeve" labels with very rapid operating cycles owing to the limited time necessary for driving the laser device.

In a third aspect of the invention, an apparatus is provided comprising a plurality of spindles rotatable around a longitudinal axis, provided with a side surface shaped to be wound from a portion of plastic film to obtain a "shrink sleeve" label, wherein said side surface comprises zones arranged at distances from said longitudinal axis that are different from one another.

In a fourth aspect of the invention, a method is provided for producing "shrink sleeve" labels, comprising winding a portion of plastic film on a curved work surface having a cross section that has a greater extent than the extent of a circumference circumscribed to said cross section.

Owing to the third and the fourth aspect of the invention, it is possible to have an apparatus provided with spindle means that enables labels with high reliability to be obtained, reducing the risk that a "shrink sleeve" label can be damaged or even broken after being sealed. In particular, owing to the geometrical shape of the side surface, a spindle can house a portion of plastic film having a preset length in a very small space with respect to the traditional case. This further enables the label to be detached with facility as soon as it is sealed from the side surface without having to resort to great air pressure to dilate the label, which in this way is not stressed excessively.

In a fifth aspect of the invention, a "shrink sleeve" label is provided, comprising a longitudinal sealing zone that joins a pair of opposite edges of a portion of plastic film, wherein said sealing zone has a significantly reduced width, for example of the order of a millimeter.

In this way, it is possible to increase the printable surface of the label.

The invention can be better understood and implemented with reference to the attached drawings that illustrate an embodiment thereof by way of non-limitative example, in which.

Figure 1:
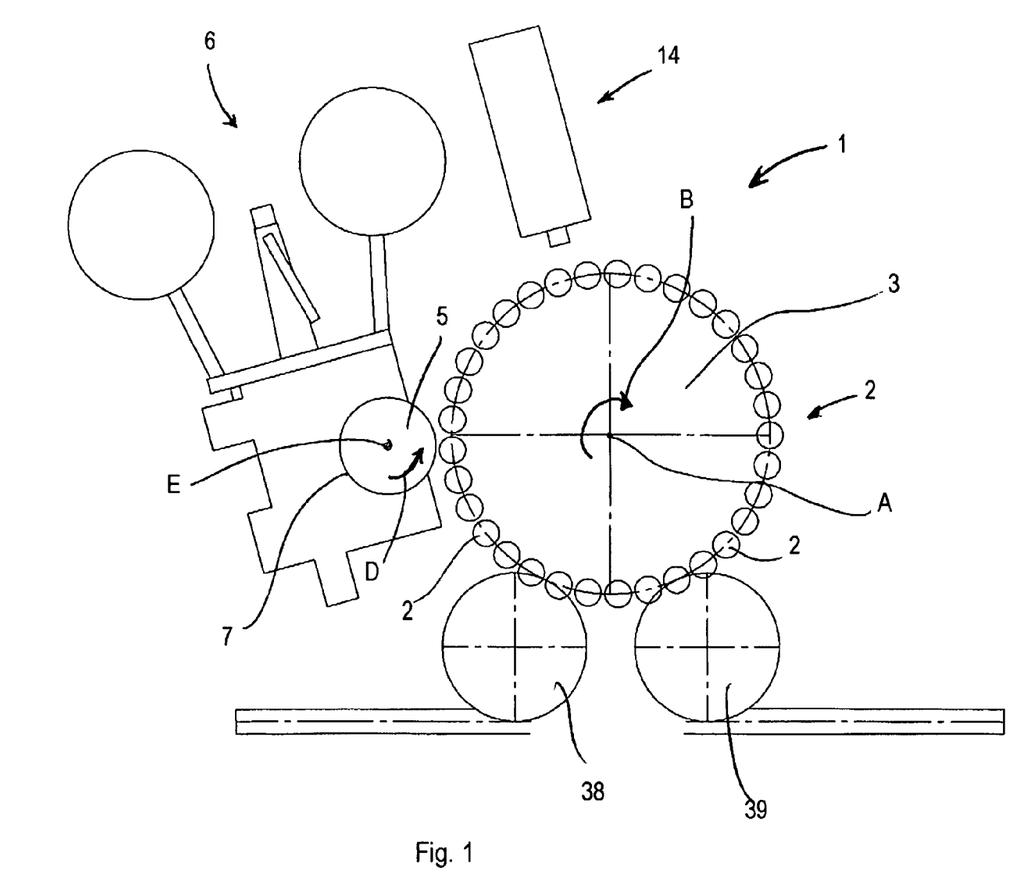
FIG. 1 is a schematic view from above of an apparatus for labelling containers.
Figure 3:
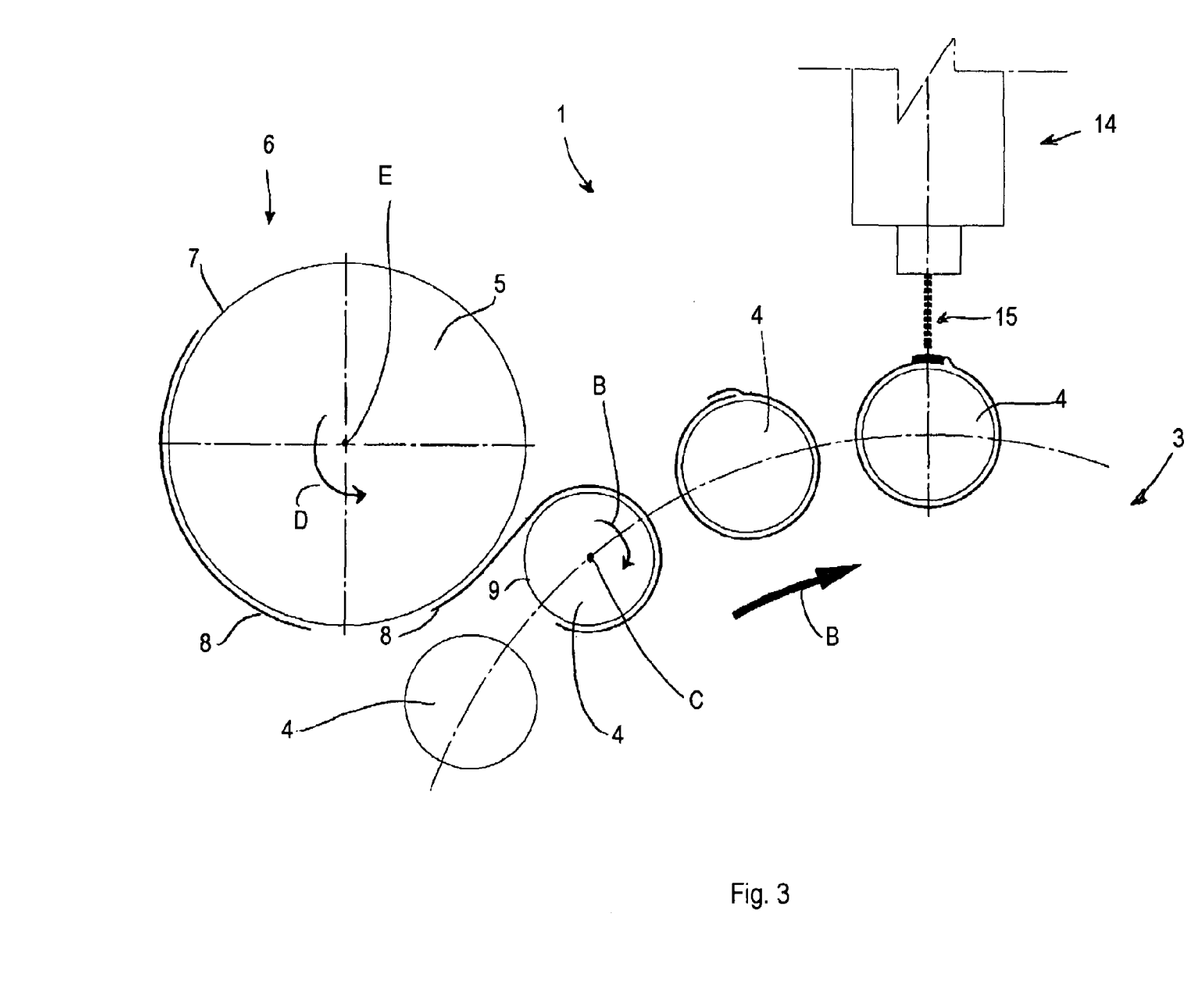
FIG. 3 shows schematically a portion of the apparatus in FIG. 2 during operation.

With reference to FIGS. 1 and 3, there is shown an apparatus 1 for labelling bottles 2, comprising a carousel 3, rotatable around a first axis A, in a first rotation direction B. The carousel 3 supports peripherally a plurality of spindles 4 on which "shrink sleeve" labels 11 are formed. The spindles 4 are distributed uniformly on the carousel 3, and are rotatable, in the first rotation direction B, around respective second axes C arranged parallel to the first axis A.

Figure 4:
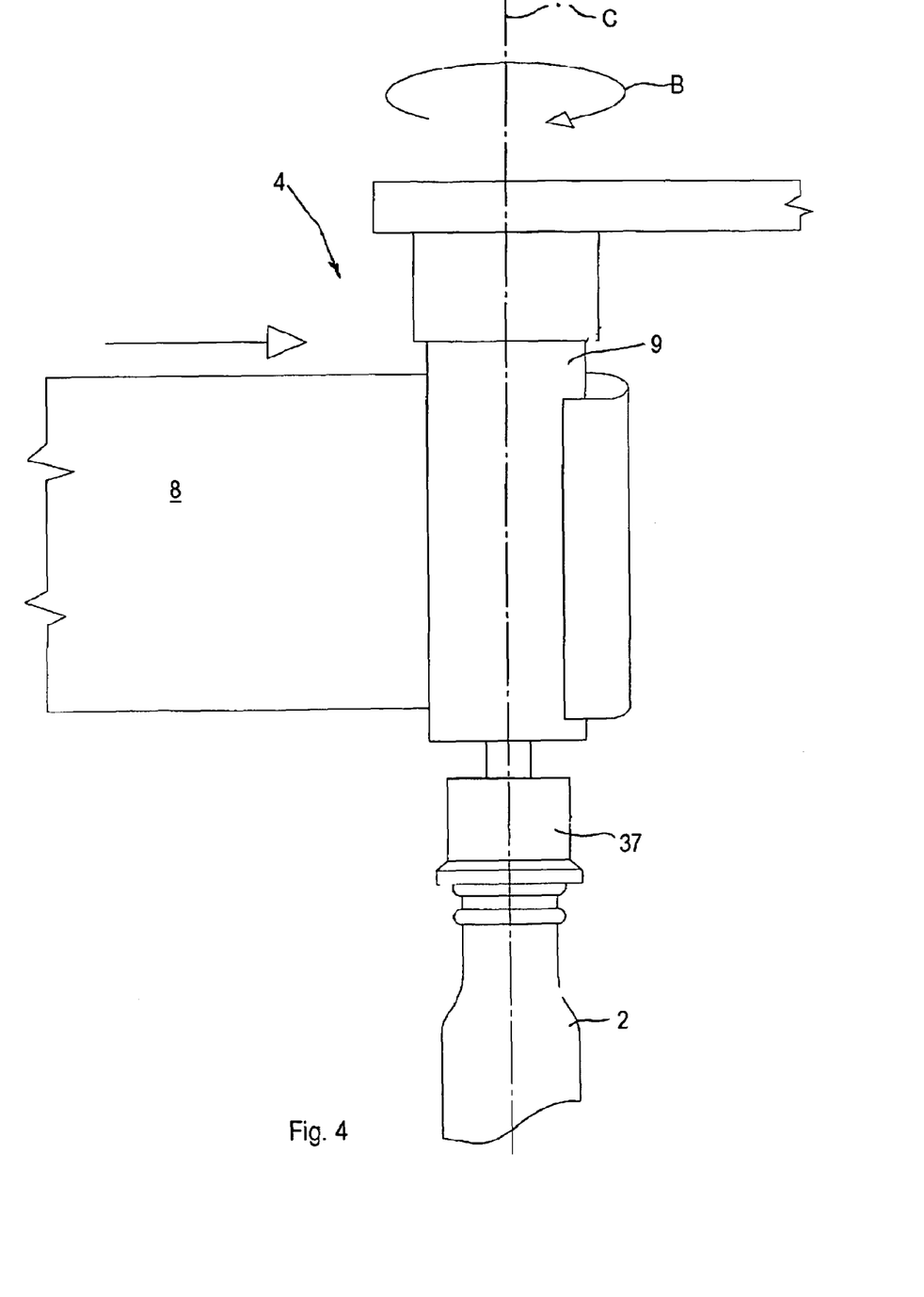
FIG. 4 is a schematic view of another portion of the apparatus in FIG. 1 or 2 during operation.
Figure 11:
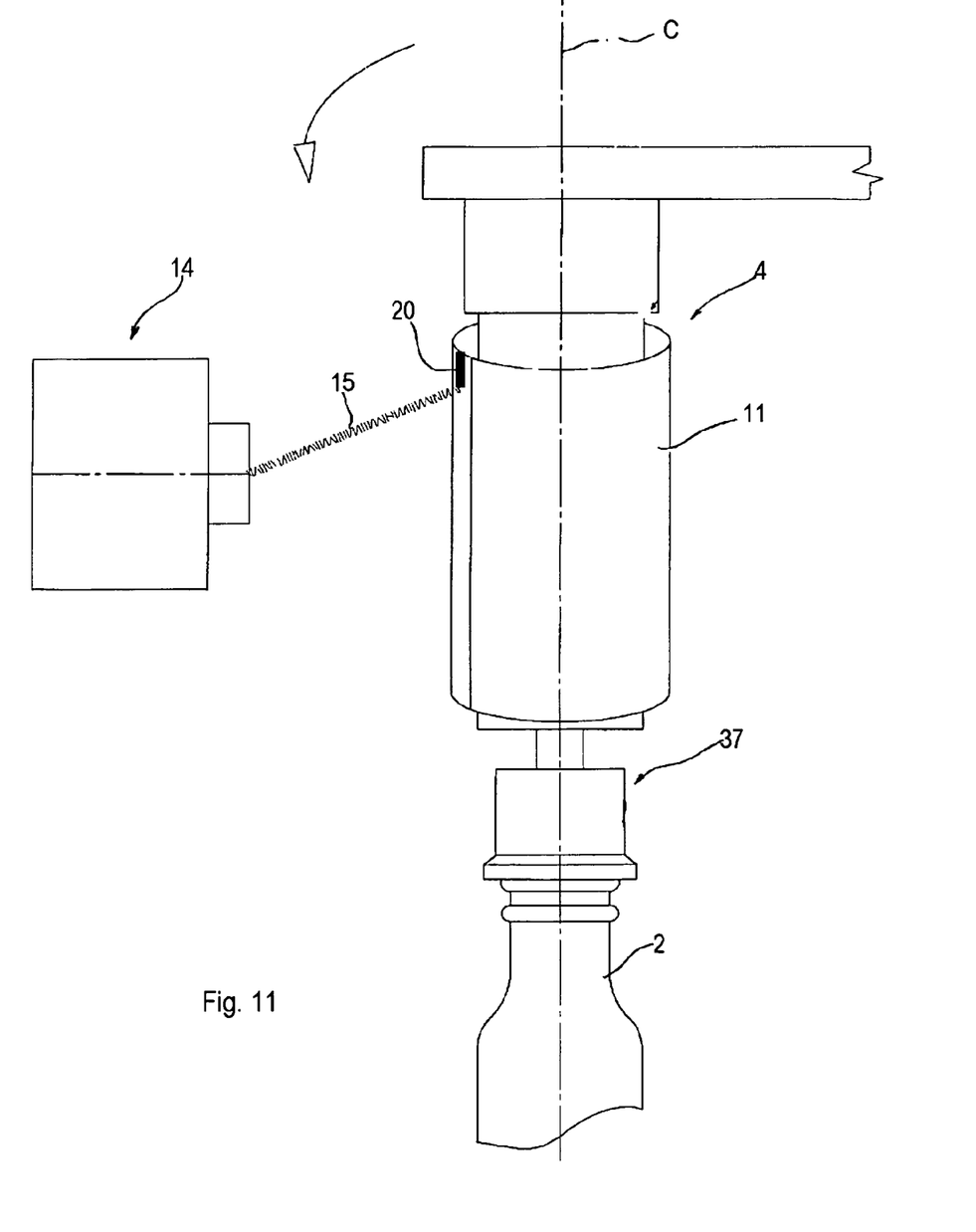
FIG. 11 is a schematic view of a further portion of the apparatus in FIG. 1 or 2 that shows a laser device during operation.
Figure 17:
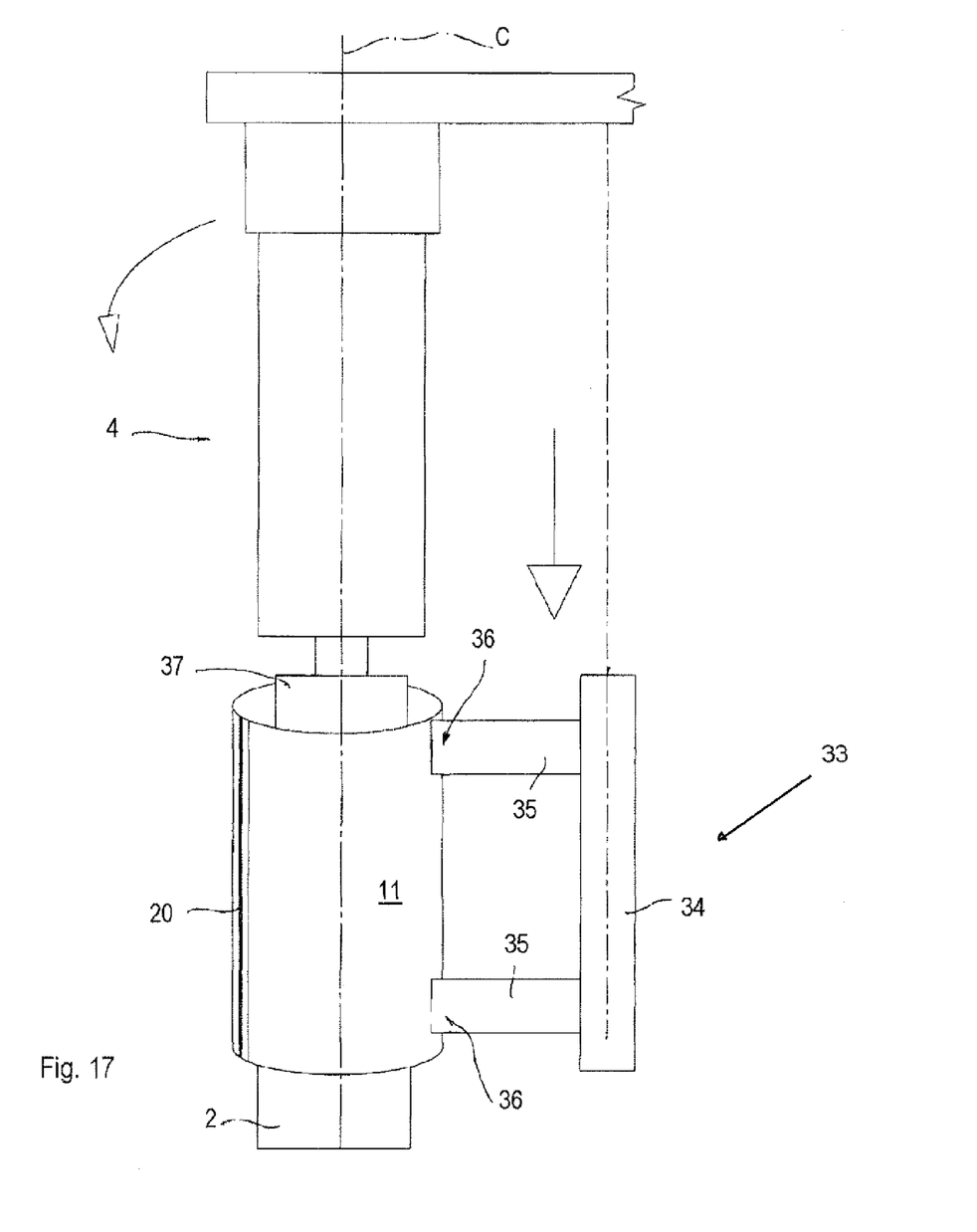
FIG. 17 shows a still further portion of the apparatus in FIG. 1 or 2 in a fourth operating configuration.

With each spindle 4 there is associated at the bottom a supporting element 37, shown in FIGS. 4, 11, and 17, that is used to support a bottle 2.

A movement device 6 is provided that moves along an advancing path a plastic film that is removed from a reel on which it was initially wound. With the movement device 6 there is associated a cutting device, arranged for cutting the plastic film transversely to the advancing path, so as to obtain portions 8 of plastic film, which are precursors of the "shrink sleeve" labels 11, each of which is transferred to a spindle 4.

The movement device 6 comprises a transferring drum 5, that is rotatable in a second rotation direction D opposite the first direction B and around a third axis E arranged parallel to the second axis C. The transferring drum 5 comprises a cylindrical side wall 7, on which there is obtained a plurality of holes connected to a pneumatic device. The pneumatic device is able to suck air inside the transferring drum 5 or expel air from the transferring drum 5 to the outside through the aforesaid holes, depending on an angular position of the latter with respect to the third axis E. By sucking air through the holes it is possible to make a portion 8 stick to the cylindrical side wall 7 after the latter has been separated from the plastic film. Through expulsion of air from the transferring drum 5 through the aforesaid holes it is on the other hand possible to detach the portion 8 from the cylindrical side wall, in such a way that it is transferred to a spindle 4 near the transferring drum 5.

Figure 5:
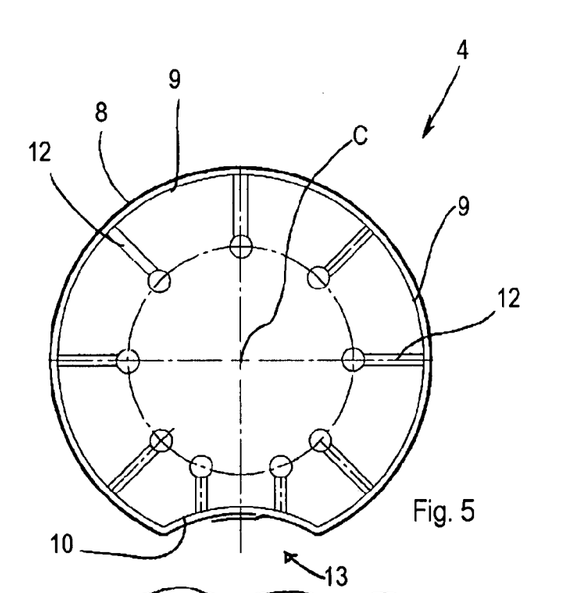
FIG. 5 shows schematically a section of a spindle with which the apparatuses in FIG. 1 or 2 are provided, in a first operating configuration.
Figure 6:
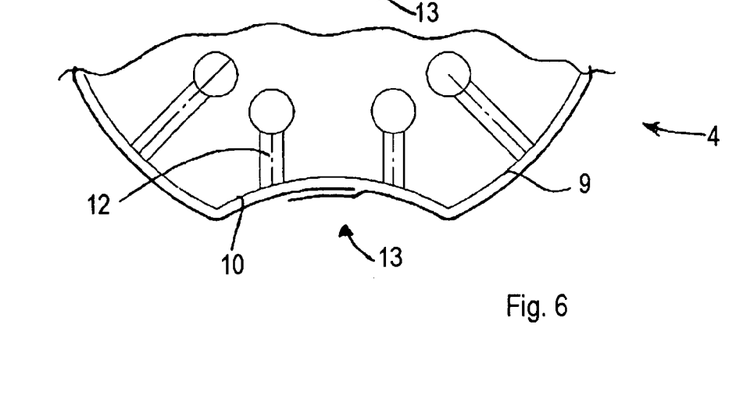
FIG. 6 is a fragmentary view that shows an enlarged detail of the spindle in FIG. 5.
Figure 7:
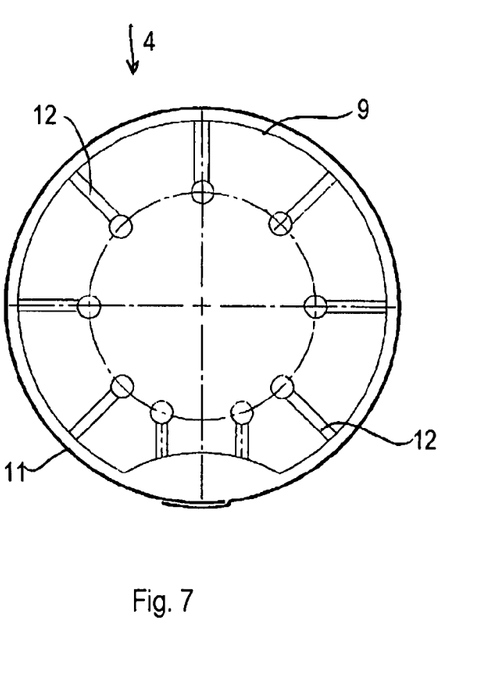
FIG. 7 is a view like the one in FIG. 5 that shows the spindle in a second operating configuration.

Each spindle 4, as better shown in FIGS. 5 to 7, comprises a side surface 9 provided with a notch 10 that extends parallel to the second axis C and is shaped for receiving therein a fraction of the portion 8 of plastic film. In particular, inside the notch 10 there are received the opposite edges of a portion 8 that have to be sealed together and therefore have to partially overlap one another in an overlapping zone 13 having a desired width. This enables it to be prevented that sealed zones protrude in an undesired manner outside the spindle 4.

Figure 9:
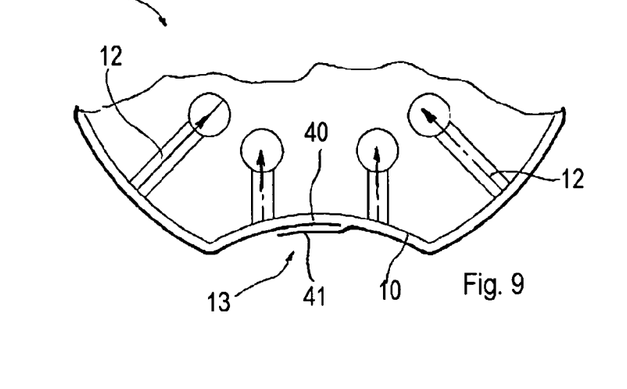
FIG. 9 is a fragmentary section that shows an enlarged detail of the spindle in FIG. 8.
Figure 9A:
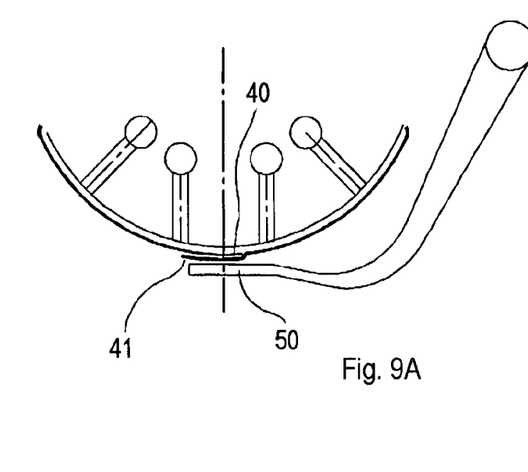
FIG. 9A is a fragmentary section like that in FIG. 9, but relating to a version of retaining devices for retaining the plastic film on the spindle.

As shown in FIG. 9A, in the overlapping zone 13 the opposite edges of the portion of plastic film to be sealed can be kept pressed against one another by means of a pressing element 50 supported on the carousel and movable between a neutral position in which it is at a certain distance from the side surface 9 of the spindle 4 and a grasping position in which it presses the overlapping edges of the portion 8 against the side surface 9.

Figure 8:
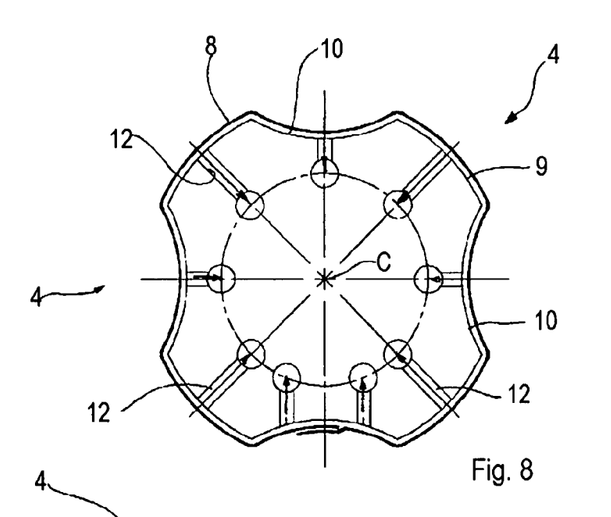
FIG. 8 shows schematically a section of an embodiment of a spindle with which the apparatuses in FIG. 1 or 2 are provided, in a third operating configuration.
Figure 10:
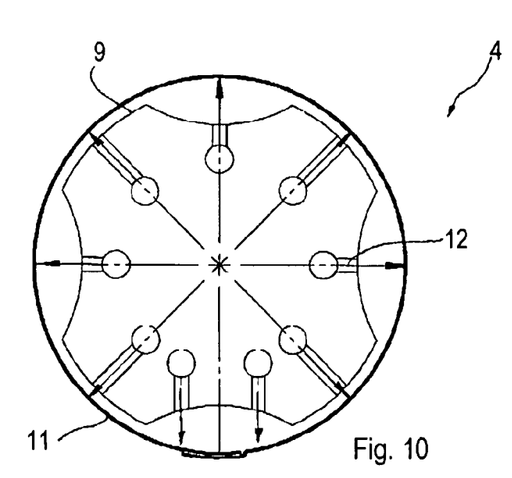
FIG. 10 is a view like the one in FIG. 8 that shows the spindle in a fourth operating configuration.

In FIGS. 8 to 10, there is shown an embodiment of a spindle 4, in which the side surface 9 is provided with four uniformly distributed notches 10. However, it is possible to provide any number of notches 10.

On the side surface 9 there are obtained further holes 12 through which it is possible to suck air from outside inside the spindle 4 or to expel air outside the spindle 4.

By the sucking of air through the further holes 12 it is possible to make a portion 8 removed by the transferring drum 5 adhere to the side surface 9, as shown in FIG. 8, or to expel air so as to detach from the side surface 9 of a label 11 that has just been obtained from a portion 8 and is ready to be applied to a bottle 2.

Owing to the notches 10, when a label 11 adheres to the side surface 9, it has an extent greater than the ideal circumscribed circumference of the spindle 4, i.e. of the circumference that the spindle 4 would have if the notches 10 were not present.

This makes it possible to detach the label 11 from the side surface 9 and remove it axially from the spindle 4 with facility.

With reference to FIGS. 1, 3, and 11 to 16, a laser device 14 is provided for sealing together the opposite edges of the portions 8 of plastic film supported on the spindles 4. The laser device 14 is situated outside the carousel 3 and downstream of the transferring drum 5.

Figures 12, 13:
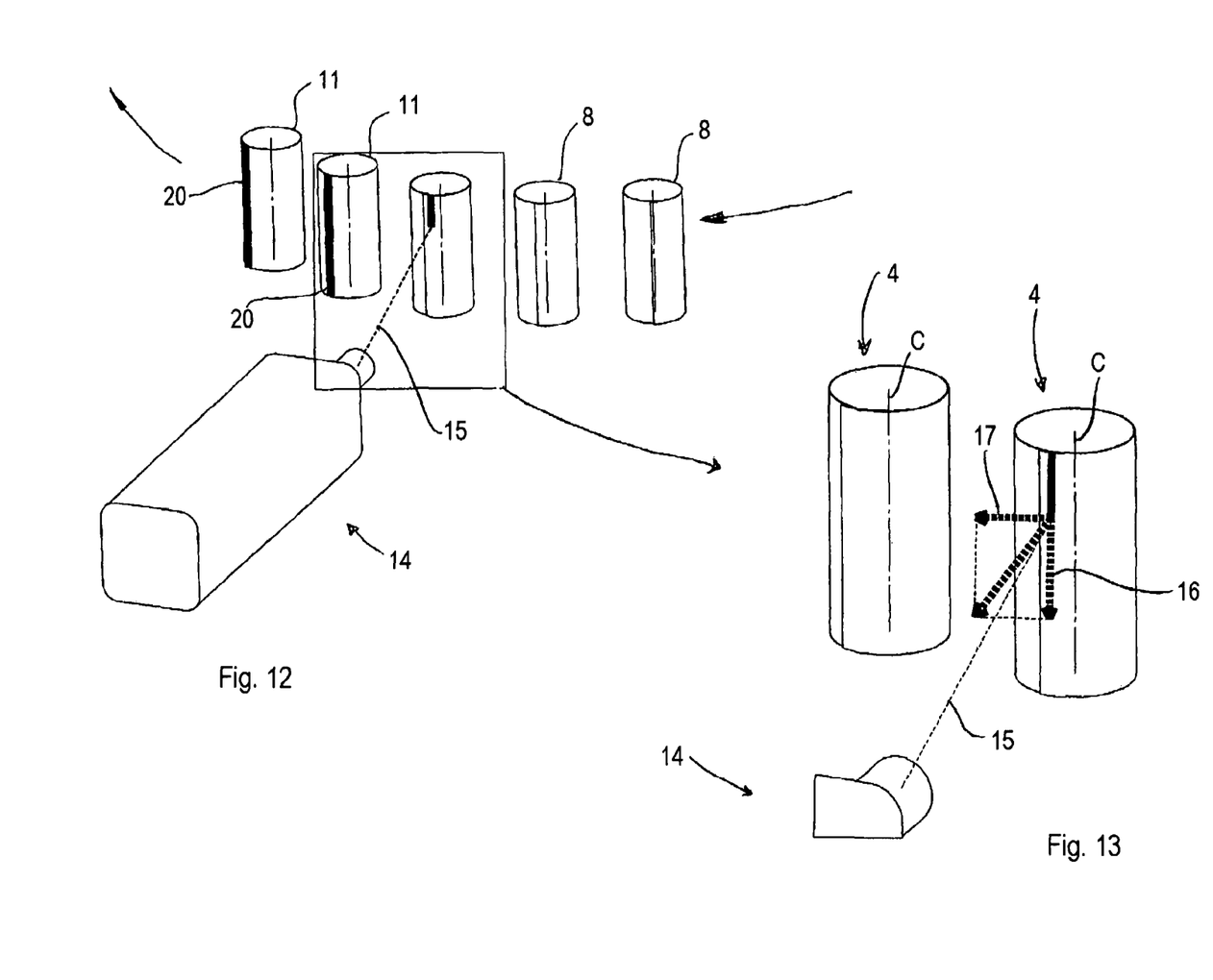
FIG. 12 is another schematic and perspective view of the laser device in FIG. 11 during operation.
FIG. 13 is an enlarged detail of FIG. 12 that shows the laser device during operation.

The laser device 14 is able to emit a laser beam 15 that is directed to the overlapping edges of a portion 8, in such a way as to travel longitudinally along the latter.

As a spindle 4, after receiving a portion 8, is dragged by the carousel 3 that rotates around the first axis A, the laser device 14 is able to follow the moving spindle 4 so that the laser beam 15 can travel correctly along the edges to be sealed.

Owing to the movement of the laser beam by means of a scanner optic, the system seals the label by following the sealing joint position whilst it moves on the turntable 3. Sealing is thus performed on the diagonal of a rectangle having an height corresponding to the height of the label and having a base calculated in function of the rotation speed of the turntable, acquired by the PLC of the line before the start of sealing.

The laser beam 15 has a first speed component 16 parallel to the second axis C, and a second speed component 17 transverse to the second axis C, in accordance with the advancing direction of the carousel 3 and substantially equal to the tangential speed at which the edges are moved.

Figure 14:
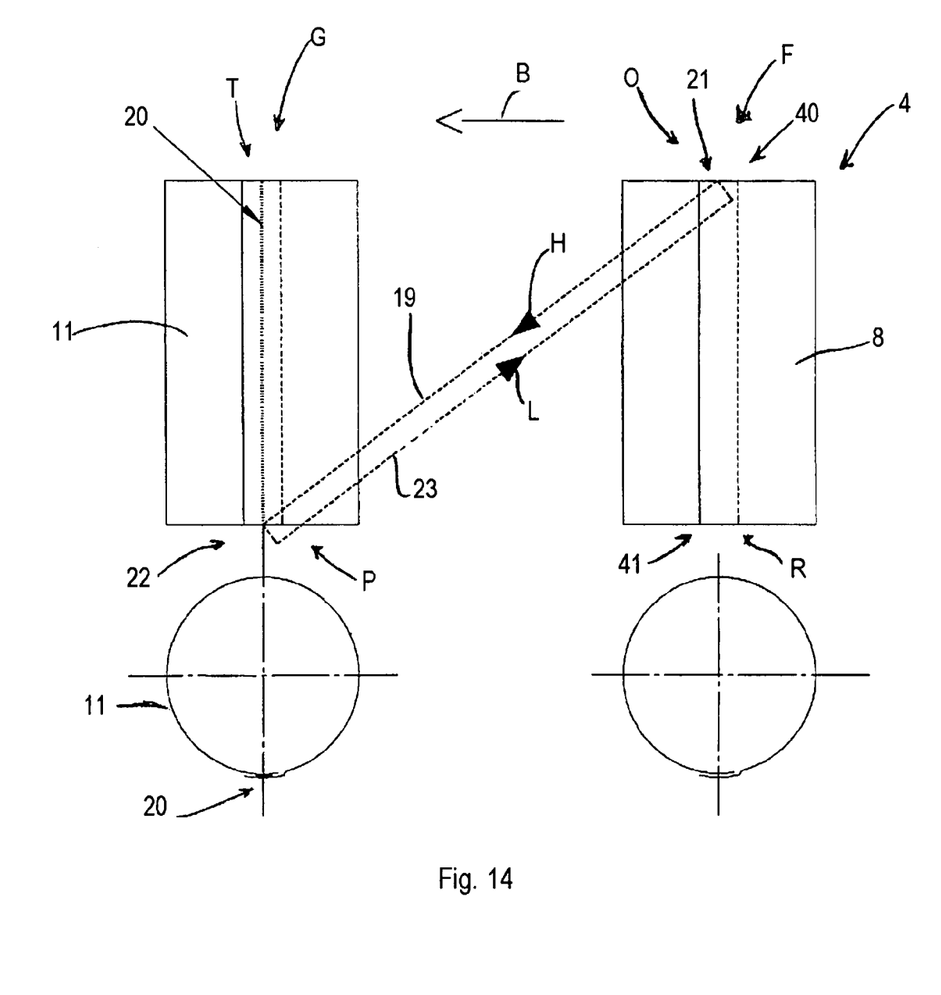
FIG. 14 shows schematically a first operating mode of the laser device.

As better shown in FIG. 14, whilst the spindle 4 is advanced from a first position F, nearer the transferring drum 5, to a second position G in which the spindle 4 has been moved by a certain amount, the laser device 14 now moves from an initial configuration to a final configuration, in such a way that the laser beam 15 moves from an initial zone 21, in which it interacts with first end portions 40 of the edges, to a final zone 22, in which it interacts with second end portions 41 of the edges, travelling along a first distance 19 in the direction indicated by a first arrow H, so as to generate a sealed zone 20. The laser device 14, after generating the sealed zone 20, interrupts the emission of the laser beam 15 and moves again so as to be able to perform a new seal on a further portion 8 that in the meantime has been conveyed to the first position F. The laser device 14, in order to again reach the initial zone 21, identifies a second distance 23 parallel to the first distance 19, in a direction indicated by a second arrow L opposite the first arrow H. Depending on the speed at which sealing is performed, it is possible to provide for the laser device 14 taking less time to return to the initial configuration from the final configuration if it moves from the final configuration to the initial configuration. This is necessary so that the laser device 14 can reach the initial zone 21 of a subsequent portion 8 before or at the moment at which the latter has reached the first position F.

Figure 15:
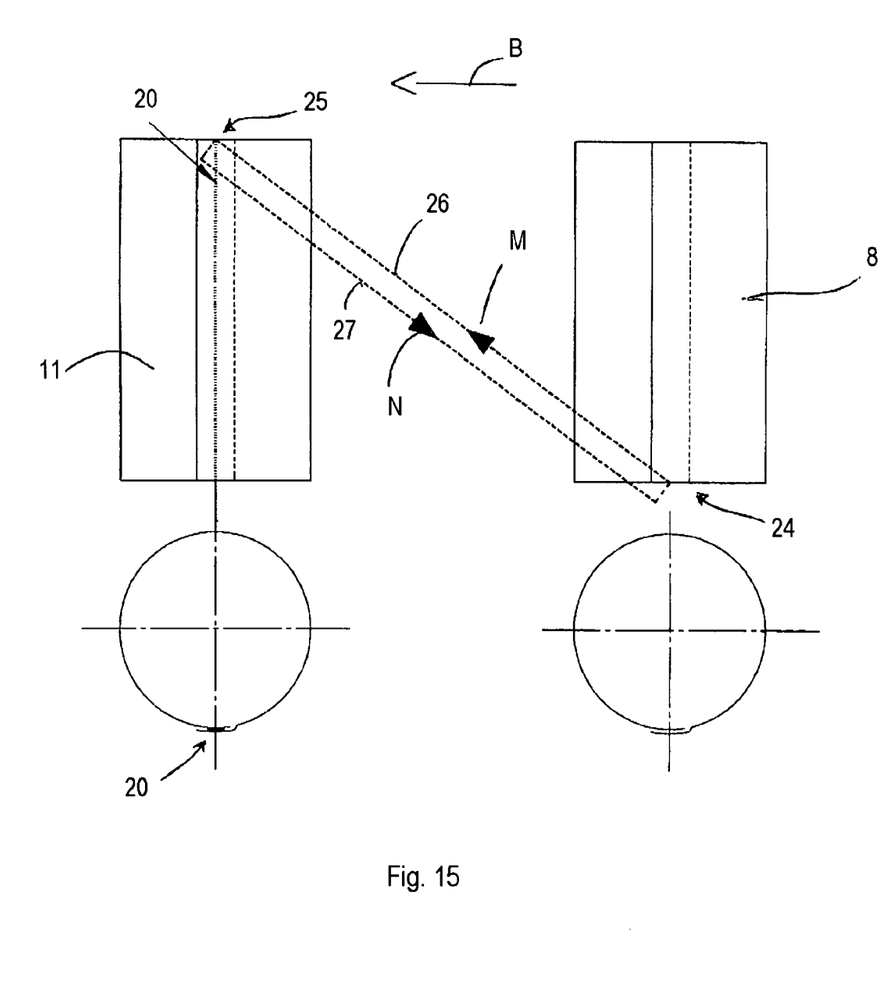
FIG. 15 shows schematically a second operating mode of the laser device.

In an embodiment of the apparatus 1, with reference to FIG. 15, it is possible to provide for the laser device 14 operating in such a way that the laser beam 15 moves from a further initial zone 24, near a lower end of the portion 8, to a further final zone 25, near an upper end of the portion 8, travelling along a third distance 26 in the direction indicated by a third arrow M, so as to generate a sealed zone 20. The laser device 14, in order to again reach the further initial zone 24, identifies a fourth distance 27 parallel to the third distance 26, in a direction indicated by a fourth arrow N opposite the third arrow M. The speeds that affect the laser device 14 in this embodiment are similar to those disclosed with reference to FIG. 14.

Figure 16:
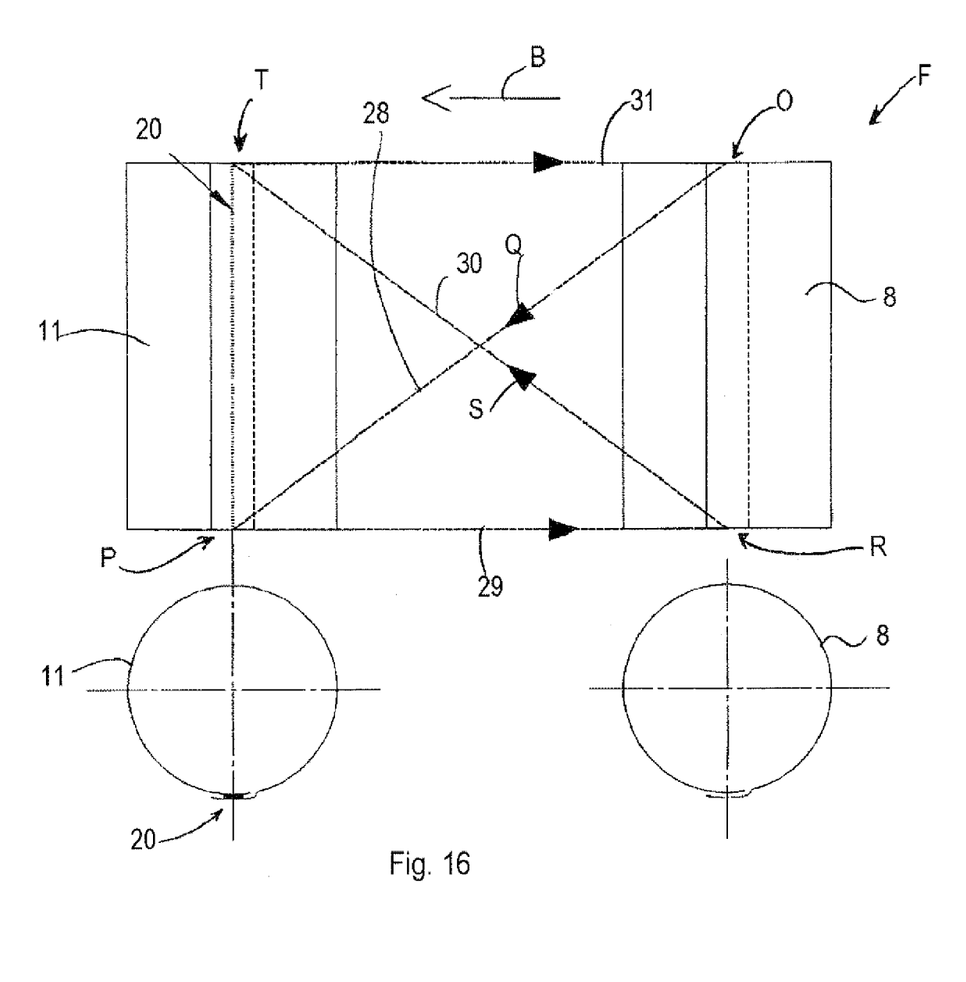
FIG. 16 shows schematically a third operating mode of the laser device.

In another embodiment of the apparatus 1, with reference to FIG. 16, it is possible to provide for the laser device 14 directing the laser beam 15 in such a way that the latter travels along a first path and a second path in an alternating manner. In particular, the laser beam 15 is directed from a first zone O, near an upper end of the portion 8, to a second zone P, near a lower end of the portion 8, travelling along a fifth distance 28, in the direction indicated by a fifth arrow Q. Another sealed zone 20 is thus generated. Subsequently, the laser device 14 interrupts the laser emission and arranges itself so as to reach a third zone R near a lower end of the portion 8, defining a sixth distance 29 that is parallel to a plane defined by the carousel 3 and which can be shorter than the fifth distance 28, thus enabling the laser device 14 to be prepared more rapidly for a subsequent sealing cycle. In this way, the laser device 14 is ready for sealing a subsequent portion 8 that in the meantime has reached the first position F. At this point, the laser device 14 emits a laser beam 15 in such a way that the latter travels along a seventh distance 30, in the direction indicated by a sixth arrow S, moving from the third zone R to a fourth zone T near the upper end of the portion 8, thus generating the sealed zone 20.

Lastly, the laser device 14 again interrupts the laser emission and is arranged in such a way as to reach the first zone O, defining an eighth distance 31 parallel to the sixth distance 29. In this way, the laser device 14 is ready to seal a further portion 8 that in the meantime has reached the first position F, according to the methods that have just been disclosed.

Figure 2:
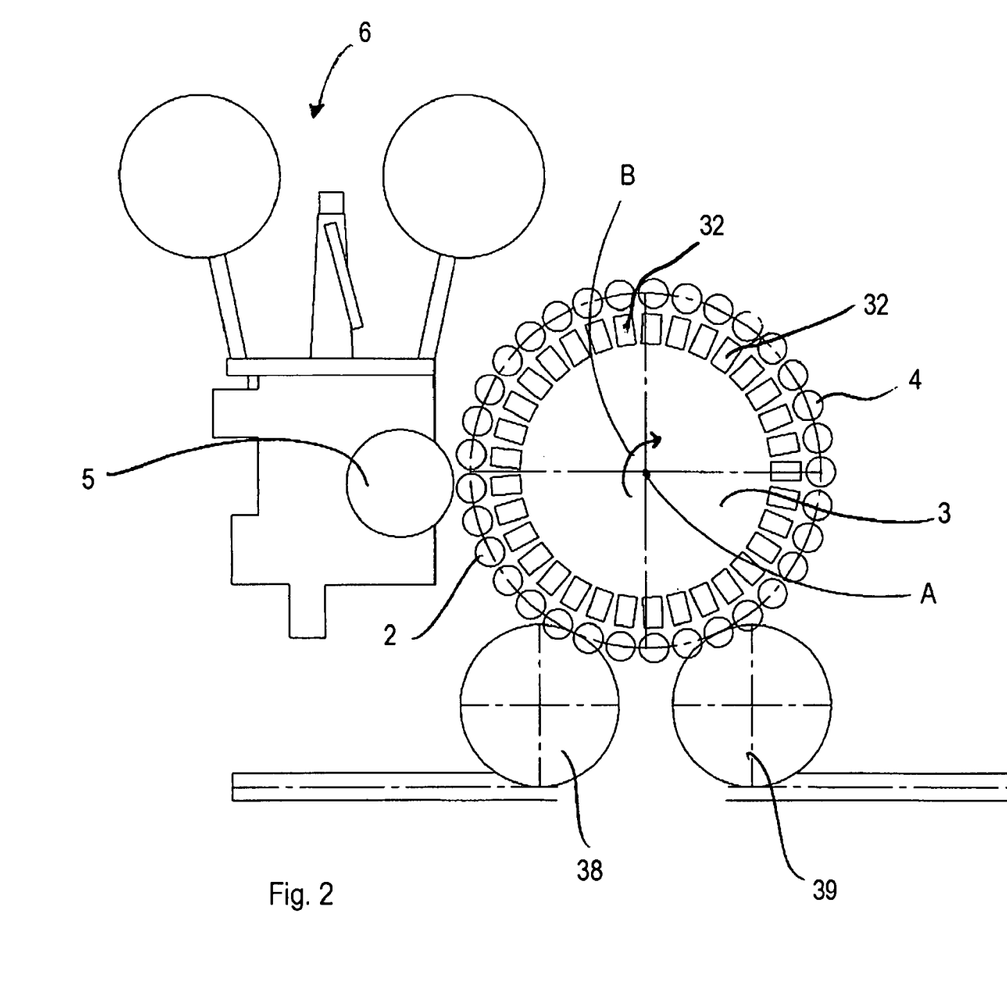
FIG. 2 is a schematic view from above of an embodiment of an apparatus for labelling containers.

With reference to FIG. 2, there is shown an embodiment of an apparatus 1 that rather than having only a laser device 14 arranged outside the carousel 3, comprises a plurality of further laser devices 32, supported on the carousel 3. Each further laser device 32 is associated with a respective spindle and cooperates with the latter to seal a portion 8 of plastic film to obtain a label 11. Owing to this configuration, each further laser device 32 being rotated by the carousel 3, it is not necessary to take account of the rotation movement associated with the carousel 3, and in this way the method is facilitated by which the laser beam is directed to the portions 8. Further, the further laser devices 32 can perform a seal at intervals of time that can be chosen more freely, inasmuch as each one of them cooperates with a sole respective spindle, unlike the embodiment disclosed with reference to FIG. 1, in which the laser device 14 has to reposition itself cyclically in an initial configuration to be able to seal successive portions 8 one at a time.

With each spindle 4 there is associated a pickup device 33 that is movable parallel to the second axis C, and arranged for transferring the label 11 from the spindle 4 to the respective bottle 2 placed under the latter and supported on the supporting element 37, as better shown in FIG. 17. The pickup device 33 comprises a body 34 to which ends 35 are fixed, each provided with a contact portion 36 shaped to interact with the surface of a label 11. Through the ends 35 air is sucked in such a way that the label 11 that has just been formed can adhere to the contact portions 36 and can be moved.

An inlet wheel 38 is provided that is used to convey bottles 2 to be labelled to the carousel 3. The inlet wheel 38 is adjacent to the carousel 3 and arranged in such a way that peripheral zones of the carousel interact first therewith and subsequently with the transferring drum 5.

The apparatus 1 further comprises an outlet wheel 39 that is used to remove bottles 2 from the carousel 3 that have been labelled. The outlet wheel 39 is adjacent to the carousel 3 and arranged downstream of the transferring drum 5 with respect to the first rotation direction B.

During operation, a bottle 2 is transferred from the inlet carousel 38 to a spindle 4 and is advanced to near the transferring drum 5.

A first end zone of the portion 8 is moved away from the cylindrical side wall 7 of the transferring drum 5 by means of air that is expelled through the holes and is made to adhere by means of air that is sucked through the further holes 12 to the side surface 9, which is rotated in the meantime. Similarly, further zones of the portion 8 are progressively made to adhere to the side surface 9.

The spindle 4 is driven in such a way that the opposite edges of the portion of material 8 are at the end overlapping one another by a suitable amount that is necessary to enable them to be subsequently sealed to obtain a label 11. Furthermore, the spindle 4 is positioned in such a way that the edges of the portion 8 are received inside a notch 10, so that they can be sealed correctly according to the above methods.

After receiving the portion 8, the spindle 4 is positioned in such a way that the edges to be sealed face the laser device 14, or the respective further laser device 32, in such a way as to be able to interact with a laser beam 15.

Once the label 11 has been sealed, it is moved away from the side surface 9 by means of air that is expelled through the further holes 12 and is moved by the pickup device 33 in such a way as to be arranged around the bottle 2, located below the spindle 4. At this point the bottle 2 and the label 11 associated with it are transferred to the outlet wheel 39 to be directed to a heating station. In the heating station the label 11 is subjected to heat treatment by means of which it retracts and adheres to the external surface of the bottle 2.

The invention claimed is:

1. Apparatus for obtaining "shrink sleeve" labels, comprising:
    a carousel rotatable about an axis, the carousel being provided peripherally with a plurality of spindles configured for being wound by portions of plastic film so that opposite edges of said portions adherently overlap one another at a sealing point position on the respective spindles,
    a sealing device cooperating with said spindles for sealing said overlapped opposite edges of said portions for obtaining said "shrink sleeve" labels, said sealing device comprising a laser device to emit a laser beam for acting on said opposite edges overlapped on one another on said spindles, said laser device being arranged outside the carousel, and
    a scanner optic to control movement of the laser beam to follow the sealing point position as it rotates about the axis of the carousel relative to the laser device.

2. Apparatus according to claim 1, wherein said laser device is configured for cooperating sequentially with a plurality of said spindles.

3. Apparatus for obtaining "shrink sleeve" labels, comprising a carousel that is provided peripherally with a plurality of spindles configured for being wound by portions of plastic film, each spindle of said plurality of spindles being provided with a side surface comprising zones arranged at distances from a longitudinal axis of said spindle that are different from one another and a notch extending parallel to said longitudinal axis, wherein said notch defines a sealing section provided along a concave portion of the notch to adherently receive inside the notch opposite edges of said portion to be sealed together, so that said opposite edges overlap one another, a sealing device being provided cooperating with said spindles for sealing said opposite edges for obtaining said "shrink sleeve" labels, said sealing device comprising a laser device to direct a laser beam towards the sealing section within the concave portion of the notch to seal the opposite edges.

4. Apparatus according to claim 3, wherein said laser device is configured for directing a laser beam from a zone in which said laser beam acts on first end portions of said edges, to a further zone, in which said laser beam acts on second end portions of said edges opposite said first end portions, so as to generate a sealed strip.

5. Apparatus according to claim 4, wherein said laser device is arranged outside said carousel.

6. Apparatus according to claim 5, wherein said laser device is configured for cooperating sequentially with a plurality of said spindles.

7. Apparatus according to claim 6, wherein said laser device is configured for moving said laser beam at a speed having a first speed component longitudinal to said spindles and a second speed component that is equal to a peripheral speed at which said edges are moved.

8. Apparatus according to claim 3, further comprising a plurality of further laser devices supported on said carousel and cooperating with a plurality of said spindles.

9. Apparatus according to claim 8, wherein each further laser device of said plurality of further laser devices cooperates with a respective spindle of said plurality of spindles.

10. Apparatus according to claim 3, wherein said side surface comprises a plurality of notches distributed on said side surface.

11. Apparatus according to claim 3, wherein on said side surface there is obtained a plurality of holes through which air can be sucked into said spindle to make said portions adhere to said side surface, and air can be expelled outside said spindle to remove radially said "shrink sleeve" labels from said side surface.

12. Apparatus according to claim 3, wherein said sealing section defined by the notch includes a first edge surface to receive one of the opposite edges within the concave portion of the notch and a second edge surface to receive the other of the opposite edges within the concave portion of the notch.

13. Apparatus according to claim 12, wherein the first edge surface includes a first hole in communication with a vacuum source selectively applied to the one opposite edge and the second edge surface includes a second hole in communication with the vacuum source applied to the other opposite edge.

14. Apparatus according to claim 3, wherein a circumference of the spindle with the notch is greater than a circumference of the spindle if the notch were not present.

15. Apparatus for obtaining "shrink sleeve" labels according to claim 1, wherein each spindle, owing to its position on the periphery of the rotatable carousel, is movable relative to the laser device such that the distance between each spindle and the laser device varies while the laser beam is applied to the sealing point position of the opposite edges carried by each spindle.

16. Apparatus for obtaining "shrink sleeve" labels according to claim 15, wherein the scanner optic is configured to move the laser beam with a first speed component generally parallel to an axis of the spindle and a second speed component substantially equal to the tangential speed at which the sealing point position is moved.

17. Apparatus for obtaining "shrink sleeve" labels according to claim 1, wherein the laser device is configured to laser and seal an entire extent of the opposite edges.

18. Apparatus for obtaining "shrink sleeve" labels according to claim 1, wherein the scanner optic is configured to direct the beam from the top portion towards the bottom portion of a first spindle and from the bottom portion towards the top portion of a second spindle, subsequent to the first spindle.

19. Apparatus for obtaining "shrink sleeve" labels according to claim 1, wherein the laser device is operable to generate 1) a first laser beam for a first spindle of the spindles such that the first laser beam is initially directed at an upper end of the opposite edges and completes laser sealing at a lower end of the opposite edges of the first spindle, and 2) a second laser beam for a second spindle of the spindles, subsequent to the first spindle, such that the second laser beam is initially directed at an lower end of the opposite edges and completes laser sealing at an upper end of the opposite edges of the second spindle.

20. Apparatus for obtaining "shrink sleeve" labels according to claim 19, wherein the laser device is operable to generate the first and second laser beams along a first pair of vectors having substantially equal lengths and opposite directions, and the laser device is movable along a return path having second vector with a length that is less than either of the first pair of vectors and perpendicular to the axes of the spindles, to re-direct the laser device from the upper end of the first spindle to the upper end of the second spindle, or the lower end of the first spindle to the lower end of the second spindle.

21. Apparatus for obtaining "shrink sleeve" labels according to claim 1, wherein the laser device is operable in a mode in which the beam moves along a first diagonal path for a first spindle and a second diagonal path for a subsequent spindle, the diagonal paths crossing one another.

22. Apparatus for obtaining "shrink sleeve" labels according to claim 21, wherein the beam is moveable along a return path between operations, the return path being shorter than the first and second diagonal paths.

23. Apparatus for obtaining "shrink sleeve" labels according to claim 1, wherein the scanner optic is operable to move the laser beam along a first path for application to the sealing point position of a first spindle and a return path along which the scanner optic positions the laser beam to the start position for a subsequent spindle.

24. Apparatus for obtaining "shrink sleeve" labels according to claim 1, wherein the scanning device consists of a single said laser device.

25. Apparatus for obtaining "shrink sleeve" labels according to claim 1, further comprising a heating station, down stream of the carousel, on which the labels are subjected to heat treatment by means of which the label retracts or shrinks and adheres to the external surface of the bottle.

26. A method for obtaining "shrink sleeve" labels, comprising:
  providing a carousel rotatable about an axis,
  providing the carousel peripherally with a plurality of spindles;
  winding portions of plastic film around the spindles so that opposite edges of said portions adherently overlap one another at a sealing point position on the respective spindles;
  providing a sealing device cooperating with said spindles for sealing said overlapped opposite edges of said portions for obtaining said "shrink sleeve" labels, said sealing device comprising a laser device;
  using said laser device, emitting a laser beam on said opposite edges overlapped on one another on said spindles;
  arranging said laser device outside the carousel; and
  controlling movement of the laser beam to follow the sealing point position using a scanner optic as it rotates about the axis of the carousel relative to the laser device.

27. Method for obtaining "shrink sleeve" labels according to claim 26, further comprising moving each spindle, owing to its position on the periphery of the rotatable carousel, relative to the laser device such that the distance between each spindle and the laser device varies while the laser beam is applied to the sealing point position of the opposite edges carried by each spindle.

28. Method for obtaining "shrink sleeve" labels, comprising:
  providing a carousel that is provided peripherally with a plurality of spindles configured for being wound by portions of plastic film;
  providing each spindle of said plurality of spindles with a side surface comprising zones arranged at distances from a longitudinal axis of said spindle that are different from one another and a notch extending parallel to said longitudinal axis;
  defining a sealing section provided along a concave portion of the notch to adherently receive inside the notch opposite edges of said portion to be sealed together, so that said opposite edges overlap one another; and
  providing a sealing device being cooperating with said spindles for sealing said opposite edges for obtaining said "shrink sleeve" labels, said sealing device comprising a laser device to direct a laser beam towards the sealing section within the concave portion of the notch to seal the opposite edges.

\* \* \* \* \*